(12) United States Patent  (10) Patent No.: US 7,656,126 B2
Sato  (45) Date of Patent: Feb. 2, 2010

(54) ABNORMALITY DETECTION APPARATUS FOR SECONDARY BATTERY DEVICE

(75) Inventor: Yuji Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 11/617,855

(22) Filed: Dec. 29, 2006

(65) Prior Publication Data
US 2007/0164710 A1 Jul. 19, 2007

(30) Foreign Application Priority Data
Jan. 16, 2006 (JP) .............. P2006-007646

(51) Int. Cl.
H02J 7/00 (2006.01)
(52) U.S. Cl. ...................... 320/134; 320/136
(58) Field of Classification Search ............... 320/121, 320/122, 134, 136, 158, 163; 363/54; 324/429; 361/90, 91.1, 91.5, 92; 340/635, 636
See application file for complete search history.

(56) References Cited

U.S. PATENT DOCUMENTS 5,875,085 A * 2/1999 Farley ................... 361/18
6,188,109 B1 * 2/2001 Takahashi .............. 257/355
2004/0051534 A1 * 3/2004 Kobayashi et al. ......... 324/429
2006/0233004 A1 * 10/2006 Furukawa et al. ......... 365/1
2007/0285062 A1 * 12/2007 Cherng et al. ............ 320/136

FOREIGN PATENT DOCUMENTS

| JP | 2-136445 | 11/1990 |
|----|----------|---------|
| JP | 2000-312439 | 11/2000 |
| JP | 2001-174531 | 6/2001 |
| JP | 2003-92840 | 3/2003 |

* cited by examiner

Primary Examiner—Edward Tso
Assistant Examiner—M'baye Diao
(74) Attorney, Agent, or Firm—Oblon, Spivak, McClelland, Maier & Neustadt, L.L.P.

(57) ABSTRACT

There is provided an abnormality detection apparatus for a secondary battery device having n secondary batteries (where n is 2 or more) connected in series for obtaining a high battery voltage. The apparatus includes n voltage detecting circuits which outputs high-level signals at a normal voltage between both terminals of each of the n secondary batteries, n N-channel field effect transistors having gates to which outputs of the n voltage detecting circuits are respectively supplied, and n P-channel field effect transistors having gates to which drain voltages of the n N-channel field effect transistors are respectively supplied. In the n P-channel field effect transistors, a drain of a P-channel field effect transistor is connected to a source of the next P-channel field effect transistor successively, thus detecting an abnormality by a voltage obtained at a drain of the n-th P-channel field effect transistor.

14 Claims, 1 Drawing Sheet

ABNORMALITY DETECTION APPARATUS FOR SECONDARY BATTERY DEVICE

BACKGROUND OF THE INVENTION

1. Field of the Invention

The present invention relates to an abnormality detection apparatus for a secondary battery device, which detects an abnormality of over-charging or over-discharging in a secondary battery, and which is advantageously mounted on a battery pack, together with, e.g., lithium ion secondary batteries.

2. Description of Related Art

Generally, as a power source for electric power tool, system backup, or the like, one having 5 or more, e.g., 7 lithium ion secondary batteries connected in series for obtaining a large electric current is used.

Lithium ion secondary batteries are easily affected by over-charging or over-discharging, and, when the battery is used at a voltage beyond a predetermined range, there is a possibility that the materials used in the battery decompose and the capacity is markedly lowered or the battery suffers uncontrolled temperature elevation, thus making it difficult to use the battery normally.

For this reason, in the use of a lithium ion secondary battery, generally, the upper limit voltage and lower limit voltage of the battery are definitely specified, and charging or discharging of the battery is controlled so that the terminal voltage falls in this range, or the battery and a protecting circuit for restricting the voltage to the range are used in combination.

An abnormality detection apparatus for a secondary battery device is disclosed, for example, in Japanese Unexamined Patent Application Publication No. 2001-174531 (Patent Document 1). The abnormality detection apparatus disclosed in the Patent Document 1 detects an abnormality in charging or discharging with respect to an assembled battery which includes a plurality of cell groups connected in series in which each cell group having connected in series a plurality of unit cells including a secondary battery.

SUMMARY OF THE INVENTION

However, the abnormality detection apparatus disclosed in the Patent Document 1 has a disadvantage in that the configuration is relatively complicated, thus increasing the cost.

In view of the above, the present invention provides an abnormality detection apparatus for a secondary battery device having a plurality of secondary batteries connected in series with a relatively simple configuration.

The abnormality detection apparatus for a secondary battery device according to an embodiment of the present invention has n secondary batteries (where n is 2 or more) connected in series for obtaining a high battery voltage corresponding to the n secondary batteries. The apparatus includes: n voltage detecting circuits, n N-channel field effect transistors, and n P-channel field effect transistors. The n voltage detecting circuits output high-level signals at a normal voltage in a range from a lower limit voltage to an upper limit voltage between both terminals of each of the n secondary batteries. The n N-channel field effect transistors have gates to which the outputs of the n voltage detecting circuits are respectively supplied. The n P-channel field effect transistors have gates to which drain voltages of the n N-channel field effect transistors are respectively supplied. In the n P-channel field effect transistors, the drain of the 1st P-channel field effect transistor is connected to the source of the 2nd P-channel field effect transistor, and successively the drain of the 2nd P-channel field effect transistor is connected to . . . the source of the n-th P-channel field effect transistor, thus detecting an abnormality by a voltage obtained at the drain of the n-th P-channel field effect transistor.

DESCRIPTION OF THE EMBODIMENT

Figure 1:
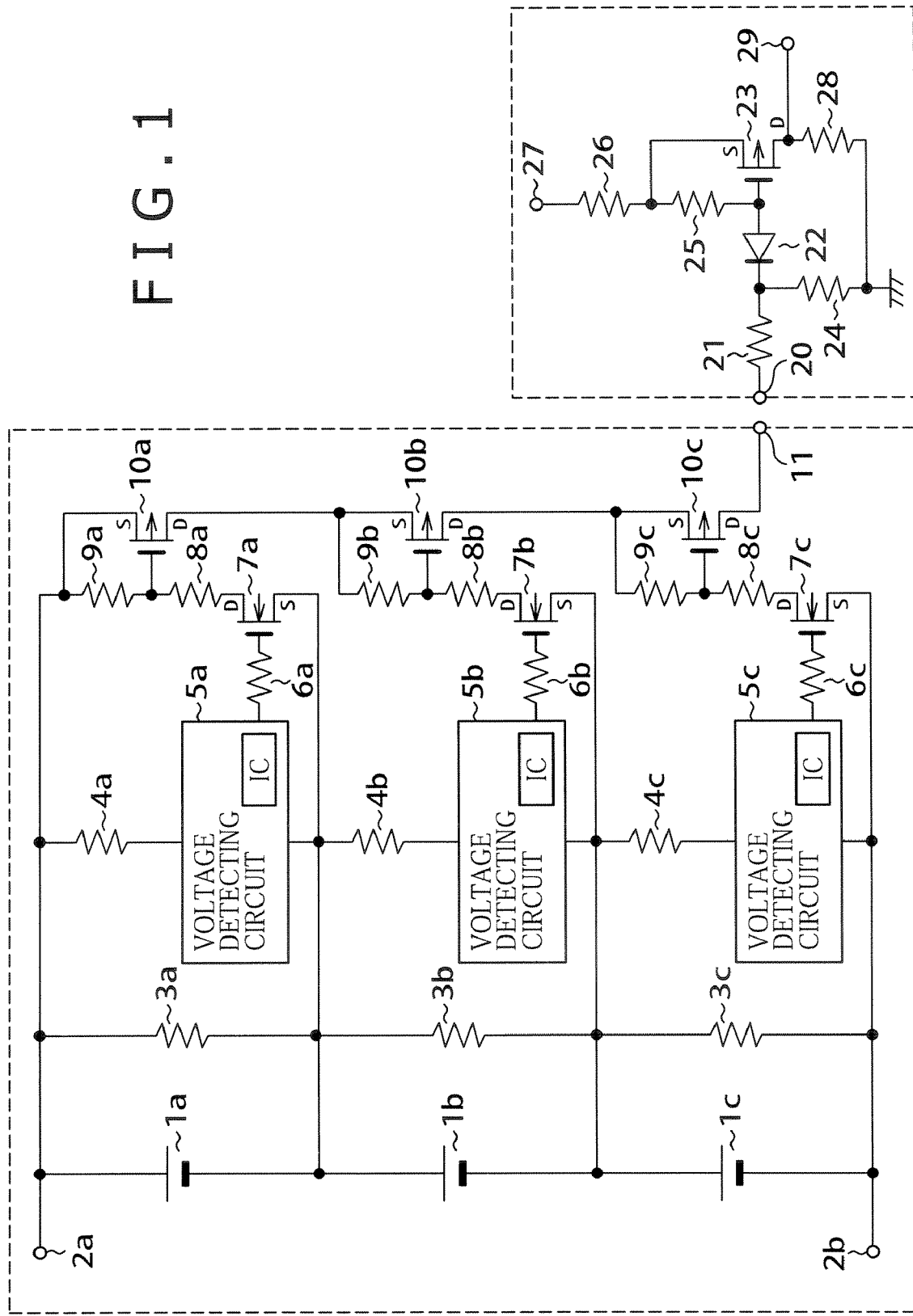
FIG. 1 is a view showing the construction of an example of an abnormality detection apparatus for a secondary battery device according to an embodiment of the present invention.

Hereinbelow, an example of an abnormality detection apparatus for a secondary battery device according to an embodiment of the present invention will be described with reference to FIG. 1.

In the example shown in FIG. 1, a plurality of, for example, three lithium ion secondary batteries $1a$, $1b$, and $1c$ are connected in series to compose a secondary battery device, and a battery voltage according to the three lithium ion secondary batteries $1a$, $1b$, and $1c$, for example, 12 V, is obtained between positive and negative electrode charging-discharging terminals $2a$ and $2b$ of a series circuit of the three lithium ion secondary batteries $1a$, $1b$, and $1c$ in the secondary battery device. In the present example, the secondary battery device includes three lithium ion secondary batteries connected in series, but the secondary battery device may include n lithium ion secondary batteries (where n is 2 or more) connected in series. For example, 5 or more lithium ion secondary batteries may be employed.

In the present example, resistors $3a$, $3b$, and $3c$ are connected in parallel, respectively, to the lithium ion secondary batteries $1a$, $1b$, and $1c$, and further respective series circuits of resistors $4a$, $4b$, and $4c$ and voltage detecting circuits $5a$, $5b$, and $5c$ are connected in parallel, respectively, to the lithium ion secondary batteries $1a$, $1b$, and $1c$.

Each of the voltage detecting circuits $5a$, $5b$, and $5c$ is composed of a semiconductor integrated circuit (IC), and constructed so that it obtains a high-level signal at an output terminal at a voltage in a range from a lower limit voltage of a normal voltage of the lithium ion secondary batteries $1a$, $1b$, and $1c$, for example, 2.5 V, to an upper limit voltage of a normal voltage, for example, 4.2 V, and obtains a low-level signal at the output terminal at a voltage which falls outside of the above range.

In this case, the lower limit voltages and upper limit voltages of the lithium ion secondary batteries $1a$, $1b$, and $1c$ for the voltage detecting circuits $5a$, $5b$, and $5c$ are not the same, and may be determined according to the lithium ion secondary batteries $1a$, $1b$, and $1c$. In such a case, a controlled value of the battery voltage can be finely adjusted.

The output terminals of the voltage detecting circuits $5a$, $5b$, and $5c$ are respectively connected to the gates of N-channel field effect transistors $7a$, $7b$, and $7c$ through respective resistors $6a$, $6b$, and $6c$.

The drain of the N-channel field effect transistor $7a$ is connected to the positive electrode charging-discharging terminal $2a$ through a series circuit of resistors $8a$ and $9a$, and the source of the N-channel field effect transistor $7a$ is connected to the connecting point of the lithium ion secondary batteries $1a$ and $1b$.

The connecting point of the resistors $8a$ and $9a$ is connected to the gate of a P-channel field effect transistor $10a$, and the source of the P-channel field effect transistor 10a is connected to the positive electrode charging-discharging terminal 2a.

The drain of the N-channel field effect transistor 7b is connected to the drain of the P-channel field effect transistor 10a through a series circuit of resistors 8b and 9b, and the source of the N-channel field effect transistor 7b is connected to the connecting point of the lithium ion secondary batteries 1b and 1c.

The connecting point of the resistors 8b and 9b is connected to the gate of a P-channel field effect transistor 10b, and the drain of the P-channel field effect transistor 10a is connected to the source of the P-channel field effect transistor 10b.

The drain of the N-channel field effect transistor 7c is connected to the drain of the P-channel field effect transistor 10b through a series circuit of resistors 8c and 9c, and the source of the N-channel field effect transistor 7c is connected to the negative electrode charging-discharging terminal 2b.

The connecting point of the resistors 8c and 9c is connected to the gate of a P-channel field effect transistor 10c, and the drain of the P-channel field effect transistor 10b is connected to the source of the P-channel field effect transistor 10c, and a detected signal output terminal 11 is derived from the drain of the P-channel field effect transistor 10c. In the present example, the abnormality detection apparatus shown in FIG. 1 is mounted on a battery pack, together with the lithium ion secondary batteries 1a, 1b, 1c.

In the present example, a detected signal obtained at the detected signal output terminal 11 is supplied to an input terminal 20 of, for example, a driving circuit for driving a protection switch. The input terminal 20 of the driving circuit is connected to the cathode of a blocking diode 22 through a resistor 21, and the anode of the diode 22 is connected to the gate of a P-channel field effect transistor 23.

The connecting point of the resistor 21 and the diode 22 is grounded through a resistor 24. The gate of the P-channel field effect transistor 23 is connected through a series circuit of resistors 25 and 26 to a power source terminal 27 to which a direct voltage of, for example, 5 V is supplied. The connecting point of the resistors 25 and 26 is connected to the source of the P-channel field effect transistor 23. The drain of the P-channel field effect transistor 23 is grounded through a resistor 28 and an output terminal 29 is derived from the drain. A protection switch, for example, is driven in accordance with a signal obtained at the output terminal 29.

In the present example having the above-described construction, when all the lithium ion secondary batteries 1a, 1b, and 1c are normal and the voltage of each battery falls in the range from the lower limit voltage to the upper limit voltage, the output terminals of the voltage detecting circuits 5a, 5b, and 5c individually output a high-level signal. Therefore, all the N-channel field effect transistors 7a, 7b, and 7c are on, all the P-channel field effect transistors 10a, 10b, and 10c are on, the detected signal output terminal 11 outputs a high-level signal, the P-channel field effect transistor 23 composing a driving circuit is off, and the output terminal 29 of the driving circuit outputs a low-level signal, letting, e.g., a protection switch remain off.

When any one of the lithium ion secondary batteries 1a, 1b, and 1c is abnormal because the battery is over-discharged to a voltage lower than the lower limit voltage or over-charged to a voltage higher than the upper limit voltage, the output terminal of the voltage detecting circuit 5a, 5b, or 5c corresponding to the abnormal lithium ion secondary battery 1a, 1b, or 1c outputs a low-level signal. The N-channel field effect transistor 7a, 7b, or 7c corresponding to the voltage detecting circuit 5a, 5b, or 5c having the output terminal outputting a low-level signal is off, and the P-channel field effect transistor 10a, 10b, or 10c corresponding to the N-channel field effect transistor 7a, 7b, or 7c which is off is off. Therefore, in this case, the detected signal output terminal 11 outputs a low-level signal, which is outputted when an abnormality is detected. In this instance, the P-channel field effect transistor 23 is on, and a direct voltage of, for example, 5 V is obtained at the output terminal 29 of the driving circuit. As a result, a protection switch, e.g., operates, thus protecting the secondary battery device being composed of a series circuit of the lithium ion secondary batteries 1a, 1b, and 1c.

In the present example, when any one of the three lithium ion secondary batteries 1a, 1b, and 1c connected in series is abnormal because the battery is over-discharged to a voltage lower than the lower limit voltage or over-charged to a voltage higher than the upper limit voltage, the drain of the 3rd P-channel field effect transistor 10c outputs a low-level signal, thus detecting an abnormality. In addition, one voltage detecting circuit 5a, 5b, or 5c, one N-channel field effect transistor 7a, 7b, or 7c, and one P-channel field effect transistor 10a, 10b, or 10c are respectively provided with respect to one secondary battery 1a, 1b, or 1c. Therefore, the configuration is advantageously relatively simple, and, even when n, for example, 5 or more secondary batteries are connected in series, an abnormality can be detected with a similar simple configuration.

An example in which the secondary battery is a lithium ion secondary battery is described above, but the secondary battery may be a secondary battery of another type.

An example in which three lithium ion secondary batteries are connected in series is described above, but the following configuration may be employed. That is, n secondary batteries (where n is 2 or more) are connected in series for obtaining a high battery voltage corresponding to the n secondary batteries. For example, 5 or more lithium ion secondary batteries may be employed. The configuration includes n voltage detecting circuits, n N-channel field effect transistors, and n P-channel field effect transistors. The n voltage detecting circuits output high-level signals at a normal voltage in the range from the lower limit voltage to the upper limit voltage between the both terminals of each of the n secondary batteries. The n N-channel field effect transistors have gates to which the outputs of the n voltage detecting circuits are respectively supplied. The n P-channel field effect transistors have gates to which the drain voltages of the n N-channel field effect transistors are respectively supplied. In the n P-channel field effect transistors, the drain of the 1st P-channel field effect transistor is connected to the source of the 2nd P-channel field effect transistor, and successively the drain of the 2nd P-channel field effect transistor is connected to . . . the source of the n-th P-channel field effect transistor, thus detecting an abnormality by a voltage obtained at the drain of the n-th P-channel field effect transistor.

In the present invention, when any one of a plurality of the secondary batteries connected in series is abnormal because the battery is over-discharged to a voltage lower than the lower limit voltage or over-charged to a voltage higher than the upper limit voltage, the drain of the n-th P-channel field effect transistor outputs a low-level signal, thus detecting an abnormality. In addition, one voltage detecting circuit, one N-channel field effect transistor, and one P-channel field effect transistor are provided with respect to one secondary battery, and therefore the configuration is advantageously relatively simple, and, even when n, for example, 5 or more secondary batteries are connected in series, an abnormality can be detected with a similar simple configuration.

The present invention is not limited to the above examples, and it goes without saying various configurations can be employed without departing from the scope of the invention.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present invention contains subject matter related to Japanese Patent Application JP 2006-007646 filed in the Japanese Patent Office on Jan. 16, 2006, the entire contents of which being incorporated herein by reference.

What is claimed is:

1. An abnormality detection apparatus for a secondary battery device having n secondary batteries (where n is 2 or more) connected in series for obtaining a high battery voltage corresponding to the n secondary batteries, the apparatus comprising:

n voltage detecting circuits which output high-level signals at a normal voltage in a range from a lower limit voltage to an upper limit voltage between both terminals of each of the n secondary batteries;

n N-channel field effect transistors having gates to which outputs of the n voltage detecting circuits are respectively supplied; and n P-channel field effect transistors having gates to which drain voltages of the n N-channel field effect transistors are respectively supplied, wherein, in the n P-channel field effect transistors, a drain of a 1st P-channel field effect transistor is connected to a source of a 2nd P-channel field effect transistor, and successively a drain of the 2nd P-channel field effect transistor is connected to . . . a source of an n-th P-channel field effect transistor, thus detecting an abnormality by a voltage obtained at a drain of the n-th P-channel field effect transistor.

2. The abnormality detection apparatus according to claim 1, wherein the secondary battery is a lithium ion secondary battery.

3. The abnormality detection apparatus according to claim1, wherein resistors are connected in parallel, respectively, to the n secondary batteries, and respective series connections of resistors and voltage detecting circuits are connected in parallel, respectively, to the n secondary batteries and the resistors.

4. The abnormality detection apparatus according to claim 1, which is mounted on a battery pack, together with the n secondary batteries.

5. The abnormality detection apparatus according to claim 1, wherein each of the n voltage detecting circuits is constructed so that it obtains a high-level signal at an output terminal at a voltage in a range from a lower limit voltage of 2.5 V of a normal voltage of the n secondary batteries to an upper limit voltage of 4.2 V of a normal voltage and obtains a low-level signal at the output terminal at a voltage which falls outside of the range.

6. The abnormality detection apparatus according to claim 1, wherein output terminals of the n voltage detecting circuits are respectively connected to the gates of the N-channel field effect transistors through respective resistors.

7. The abnormality detection apparatus in accordance with claim 1, further comprising:

a driving circuit configured to drive a protection switch, the driving circuit including a blocking diode having a cathode connected to the drain of the n-th P-channel field effect transistor through a resistor, and an anode connected to a gate of another P-channel field effect transistor, wherein a drain of the another P-channel field effect transistor is connected to the protection switch.

8. The abnormality detection apparatus in accordance with claim 7, wherein the n voltage detecting circuits are configured to transmit a low-level signal from the drain of the n-th P-channel field effect transistor to the blocking diode of the driving circuit so as to cause the protection switch to activate when a voltage of one of the n secondary batteries is outside the range from the lower limit voltage to the upper limit voltage.

9. An abnormality detection apparatus for a battery device, the apparatus comprising:

a first battery connected to a first voltage detecting circuit in parallel to first and second terminals of the first battery, the first voltage detecting circuit configured to output a signal based on a detected voltage of the first battery to a gate of a first N-channel field effect transistor (FET), the first N-channel FET having a source connected to the second terminal of the first battery and a drain connected to both a gate of a first P-channel FET and the first terminal of the first battery, and the first P-channel FET having a source connected to the first terminal of the first battery; and a second battery connected to a second voltage detecting circuit in parallel to first and second terminals of the second battery, the second voltage detecting circuit configured to output a signal based on a detected voltage of the second battery to a gate of a second N-channel FET, the second N-channel FET having a source connected to the second terminal of the second battery and a drain connected to both a gate of a second P-channel FET and the first terminal of the second battery, and the second P-channel FET having a source connected to a drain of the first P-channel FET, wherein the first battery is connected to the second battery in series and the first voltage detecting circuit is connected to the second voltage detecting circuit in series.

10. The apparatus according to claim 9, further comprising:

a driving circuit configured to drive a protection switch, the driving circuit including a blocking diode having a cathode connected to a drain of the second P-channel FET through a resistor, and an anode connected to a gate of another P-channel FET, wherein a drain of the another P-channel FET is connected to the protection switch.

11. The apparatus according to claim 9, wherein the first voltage detecting circuit is configured to output a high-level signal to the gate of first N-channel FET when the detected voltage of the first battery is within a range of 2.5 to 4.2 V, and output a low-level signal to the gate of the first N-channel FET when the detected voltage of the first battery is outside the range of 2.5 to 4.2 V; and the second voltage detecting circuit is configured to output a high-level signal to the gate of second N-channel FET when the detected voltage of the second battery is within a range of 2.5 to 4.2 V, and output a low-level signal to the gate of the second N-channel FET when the detected voltage of the second battery is outside the range of 2.5 to 4.2 V.

12. An abnormality detection apparatus for a battery device, the apparatus comprising:

a first battery connected to a first voltage detecting circuit in parallel to first and second terminals of the first battery, the first voltage detecting circuit configured to output a signal based on a detected voltage of the first battery to a gate of a first N-channel field effect transistor (FET), the first N-channel FET having a source connected to the second terminal of the first battery and a drain connected to both a gate of a first P-channel FET and the first terminal of the first battery, and the first P-channel FET having a source connected to the first terminal of the first battery;

a second battery connected to a second voltage detecting circuit in parallel to first and second terminals of the second battery, the second voltage detecting circuit configured to output a signal based on a detected voltage of the second battery to a gate of a second N-channel FET, the second N-channel FET having a source connected to the second terminal of the second battery and a drain connected to both a gate of a second P-channel FET and the first terminal of the second battery, and the second P-channel FET having a source connected to a drain of the first P-channel FET; and a third battery connected to a third voltage detecting circuit in parallel to first and second terminals of the third battery, the third voltage detecting circuit configured to output a signal based on a detected voltage of the third battery to a gate of a third N-channel FET, the third N-channel FET, having a source connected to the second terminal of the third battery and a drain connected to both a gate of a third P-channel FET and the first terminal of the third battery, and the third P-channel FET having a source connected to a drain of the second P-channel FET, wherein the first, second and third batteries are connected in series and the first, second and third voltage detecting circuits are connected in series.

13. The apparatus according to claim 12, further comprising:

a driving circuit configured to drive a protection switch, the driving circuit including a blocking diode having a cathode connected to a drain of the third P-channel FET through a resistor, and an anode connected to a gate of another P-channel FET, wherein a drain of the another P-channel FET is connected to the protection switch.

14. The apparatus according to claim 12, wherein the first voltage detecting circuit is configured to output a high-level signal to the gate of first N-channel FET when the detected voltage of the first battery is within a range of 2.5 to 4.2 V, and output a low-level signal to the gate of the first N-channel FET when the detected voltage of the first battery is outside the range of 2.5 to 4.2 V;

the second voltage detecting circuit is configured to output a high-level signal to the gate of second N-channel FET when the detected voltage of the second battery is within a range of 2.5 to 4.2 V, and output a low-level signal to the gate of the second N-channel FET when the detected voltage of the second battery is outside the range of 2.5 to 4.2 V; and the third voltage detecting circuit is configured to output a high-level signal to the gate of third N-channel FET when the detected voltage of the third battery is within a range of 2.5 to 4.2 V, and output a low-level signal to the gate of the third N-channel FET when the detected voltage of the third battery is outside the range of 2.5 to 4.2 V.

* * * * *